July 31, 1962  H. V. DAUGHERTY  3,046,598
RELEASABLE HANGING DEVICE
Filed Dec. 23, 1959
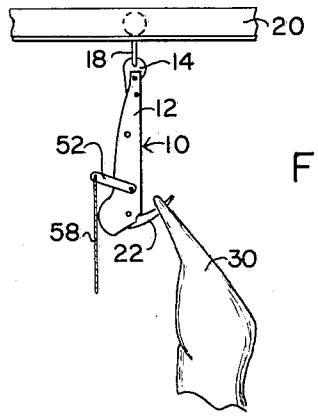
FIG. 1
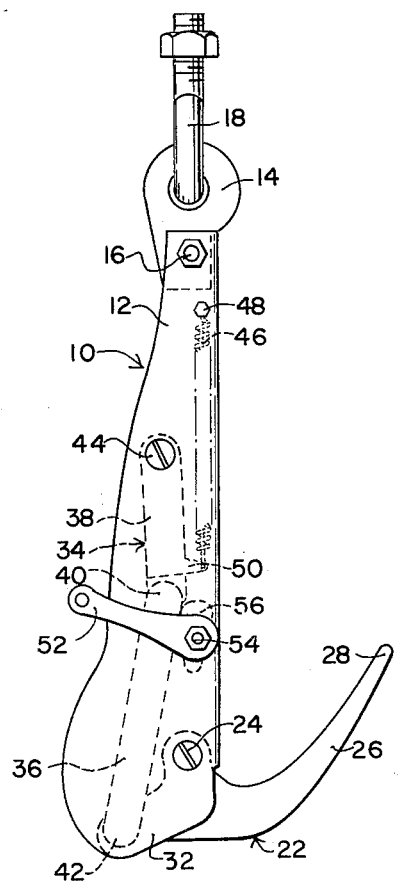
FIG. 2
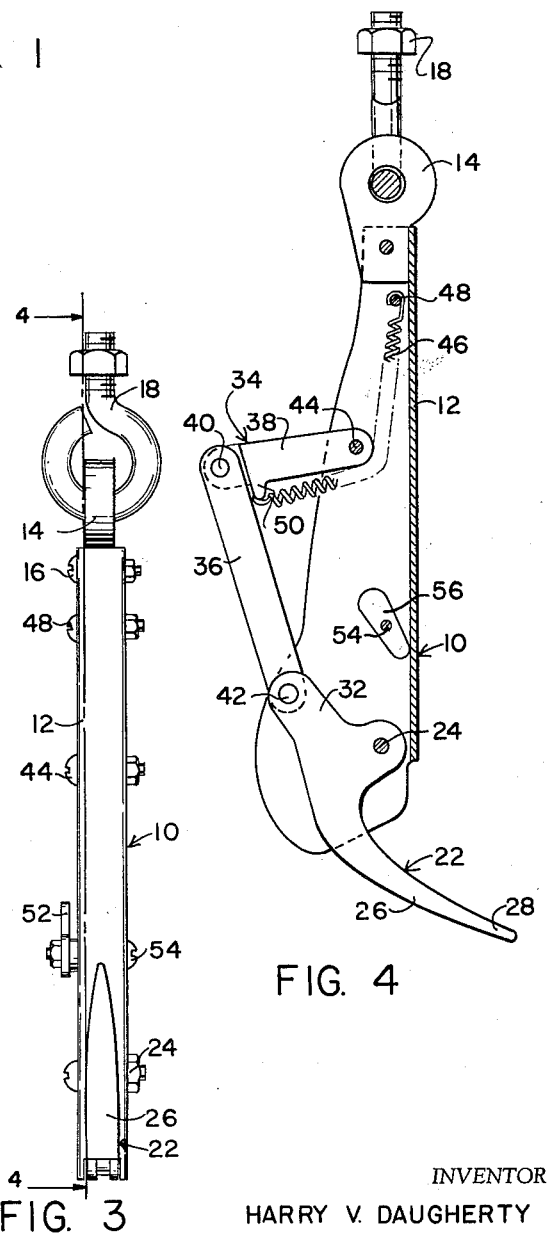
FIG. 3
FIG. 4
INVENTOR
HARRY V. DAUGHERTY
BY *John H. Widdowson*
ATTORNEY

United States Patent Office 3,046,598
Patented July 31, 1962

3,046,598
RELEASABLE HANGING DEVICE
Harry V. Daugherty, 301 W. 23rd St. North,
Wichita, Kans.
Filed Dec. 23, 1959, Ser. No. 861,599
5 Claims. (Cl. 17—44.3)

This invention relates to a releasable hanging device and, more particularly, to such a device having a hook capable of supporting a load, such as a beef carcass, in a locked position, the hook being releasable to discharge the load.

Heretofore, in meat processing plants, the carcasses were moved about on simple hooks attached to pulleys which ran on an overhead track. The operator manually lifted the carcass to remove it from the hook with consequent loss of time and energy.

In accordance with my invention, the hook on which the carcass is carried is connected to an over-center locking mechanism. When it is desired to remove the carcass, the locking mechanism is released, as by a cord or chain, whereupon the carcass simply drops onto the shoulders of the operator without requiring any lifting action. After the carcass is released, the hook is restored to its locked position by a spring which advantageously passes around a pivot member of the locking mechanism to provide an efficient restoring action with maximum economy of space.

Accordingly, it is an object of the invention to provide a releasable hanging device having a simple and effective locking mechanism.

It is a further object to provide such a device promoting easy movement of carcasses through a packing plant with minimum exertion and loss of time on the part of the operator.

It is a still further object to provide an economical mechanism for effecting the stated purpose which occupies a minimum amount of space and is extremely reliable in operation.

Various other objects, advantages and features of the invention will become apparent from the following detailed description taken in conjunction with the accompanying drawing, in which:

FIG. 1 is a view of the hook mechanism showing its cooperation with the track and the carcass which is being handled;

FIG. 2 is an enlarged front elevational view of the releasable hook mechanism;

FIG. 3 is an enlarged side elevational view of the hook mechanism; and

FIG. 4 is a vertical sectional view taken along the line 4—4 of FIG. 3 showing the hook in released position.

Referring now to the drawings in detail, and particularly to FIG. 1, I have shown a novel releasable hanging device 10 having an elongated metal body 12. An eye member 14 is secured to the body 12 by a bolt 16, the eye being attached to a pulley and hook 18 which runs on an overhead track 20 of a packing plant.

A hook member 22 is pivoted at 24 to the body 12, and this member has an upwardly curved hook 26, the outer end part 28 of which is relatively straight. In the locked position illustrated in FIGS. 1, 2 and 3 the hook is thereby adapted to receive and carry a carcass 30. When the hook is moved to the unlocked position illustrated in FIG. 4, it is evident that the carcass will slide off, for example, onto the shoulders of the operator.

A lever 32 is integral with the hook member 22, and this lever is pivotally connected to an over-center locking mechanism 34 which, advantageously, comprises a relatively long link 36 and a relatively short link 38 pivoted together at 40. The lower end of the link 36 is pivoted at 42 to the end of the lever 32, and the upper end of the link 38 is pivoted at 44 to the body 12. The distance between the pivots 24 and 44 is less than the combined length of the links 36 and 38. As a result, the links define an over-center locking device. The links are biased to an off-center locked position by a spring 46 having one end secured to a support 48 located at the upper part of the body 12 above the pivot 44. The other end of the spring is secured to a support 50 protruding from the lower part of the link 38. It will be evident that the spring 46 displaces the links 36, 38 laterally toward the hook 26.

A release latch 52 is pivoted at 54 to the body 12. This latch is attached to a cam member 56 which bears against an intermediate part of the locking mechanism 34. As shown, the cam portion 56 bears against the upper part of the link 36.

When the latch 52 is actuated, as by pulling a cord or chain 58, FIG. 1, the cam portion 56 displaces the links 36, 38 laterally in a leftward direction past center and from the position shown in FIG. 2 to the position shown in FIG. 4. This releases the locking mechanism and allows the parts to assume the respective positions shown in FIG. 4 under the weight of the carcass or other load supported by the hook. When this occurs, it will be noted that the spring 46 passes around the pivot 44 so that, when the load is released, the spring quickly and efficiently restores the links 36, 38 and hook 26 to the locked position illustrated in FIG. 2.

In operation, it will be evident that the parts are initially in the locked position shown by FIG. 2 as a result of the action of the spring 46. Thereupon, a carcass or other load can be placed upon the hook and moved about readily by the pulley 18 along the track 20. When it is desired to release the carcass, the chain 58 is pulled, thus releasing the links 34, 36 and allowing the hook to move to the position illustrated in FIG. 4 under the influence of the weight of the carcass.

Once the carcass is discharged, the spring 46 restores the parts to the respective positions illustrated by FIG. 2 in readiness for a new cycle of operation.

It will be evident that I have achieved the objects of the invention in providing a simple and reliable releasable hanging mechanism permitting more rapid and effective movement of carcasses in a packing plant than has heretofore been possible.

While the invention has been described in connection with a preferred embodiment thereof, it will be understood that this description is intended to illustrate and not limit the scope of the invention, which is defined by the appended claims.

I claim:
1. A releasable hanging device comprising, in combination, a supporting body having an eye at the upper end thereof adapted for attachment to a pulley, a hook member pivoted to said body, said member having an upwardly curved hook extending in one direction from the pivot upon which a carcass can be hung, and a lever portion extending in the other direction from the pivot, a locking assembly comprising two links of different lengths pivotally secured to each other, the longer link being pivoted to said lever portion and the shorter link being pivoted to said body, the distance between the last mentioned pivot and the pivot of said hook member being less than the combined length of said links, thereby defining an over-center locking device, a spring having one end connected to the shorter link adjacent the pivotal connection between said links, and its other end connected to the upper part of said body, said spring passing around the pivotal connection between said body and said shorter link, a release latch pivoted to said body adjacent the junction between said links, said latch having a cam member bearing against an intermediate portion of said locking assembly and arranged to displace said assembly laterally from its locked position to an unlocked position, when said latch is actuated wherein the hook swings downwardly to release the carcass, said spring passing around said pivotal connection between said body and said shorter link and thereby being in position to urge the locking assembly back to its locked position when the weight of the carcass is removed from the hook, and means for actuating said latch.

2. A releasable hanging device comprising, in combination, a supporting body having an eye at the upper end thereof adapted for attachment to a pulley, a hook member pivoted to said body, said member having an upwardly curved hook extending in one direction from the pivot upon which a carcass can be hung, and a lever portion extending in the other direction from the pivot, a locking assembly comprising two links of different lengths pivotally secured to each other, the longer link being pivoted to said lever portion and the shorter link being pivoted to said body, the distance between the last mentioned pivot and the pivot of said hook member to said body being less than the combined length of said links, thereby defining an over-center locking device, a spring having one end connected to said shorter link adjacent the pivotal connection between said links, and its other end connected to the upper part of said body, said spring biasing said links laterally to an off-center locked position wherein said links are displaced toward said hook, a release latch pivoted to said body adjacent the junction between said links, said latch having a cam member bearing against an intermediate portion of said locking assembly and arranged to in operation displace said assembly laterally from its locked position to an unlocked position when said latch is actuated wherein said hook swings downwardly to release the carcass, and an operating chain or cord attached to said latch.

3. A releasable hanging device comprising, in combination, a supporting body having an eye at the upper end thereof adapted for attachment to a pulley, a hook member pivoted to said body, said member having an upwardly curved hook upon which a carcass can be hung and a lever portion extending in a direction opposite from said hook, a locking assembly comprising two links pivotally secured to each other, one link being pivoted to said lever portion of said hook member and the other link being pivoted to said body, the distance between the last mentioned pivot and the pivot of said hook member to said body being less than the combined length of said links, thereby defining an over-center locking device, a spring connected to and extending between said other link and the upper part of said body, said spring biasing said links laterally to an off-center locked position wherein said links are displaced toward said hook, a release latch pivoted to said body adjacent the junction between said links, said latch having a cam member bearing against an intermediate portion of said locking assembly and arranged to displace said assembly laterally from its locked position to an unlocked position upon operation of said latch wherein said hook swings downwardly to release the carcass, and means for actuating said latch.

4. A system for transporting carcasses in a packing plant which comprises, in combination, an overhead track, a pulley movable along said track, a supporting body suspended from said pulley, an upwardly curved hook pivoted to said body and arranged to support a meat carcass, an over-center locking mechanism secured to said hook and said body, said mechanism having a locked position wherein the hook is arranged in carcass-supporting position, and an unlocked position wherein the hook swings downwardly to discharge the carcass, means biasing said mechanism to its locked position, and a release latch having a cam engageable with said mechanism to move it to said unlocked position, said latch being an elongated member and pivotally connected in an end portion to said body, having said cam secured thereto to turn with said elongated member, and having means in the other end portion to receive and mount latch operating means.

5. A releasable hanging device comprising, in combination, a supporting body, an upwardly curved hook pivoted to said body and arranged to support a load, an over-center locking mechanism secured to said hook and said body, said mechanism having a locked position wherein the hook is arranged in load-supporting position, and an unlocked position wherein the hook swings downwardly to discharge the load, means biasing said mechanism to its locked position, and a release latch having a cam engageable with said mechanism to move it to said unlocked position, said latch being an elongated member and pivotally connected in an end portion to said body, having said cam secured thereto to turn with said elongated member and having means in the other end portion to receive and mount latch operating means.

References Cited in the file of this patent
UNITED STATES PATENTS

| | | |
|---|---|---|
| 233,698 | Rankin | Oct. 26, 1880 |
| 1,166,382 | Morse | Dec. 28, 1915 |
| 2,714,731 | Binmore | Aug. 9, 1955 |
| 2,937,541 | Barlow | May 24, 1960 |